(12) United States Patent
Joshi et al.

(10) Patent No.: US 7,944,905 B2
(45) Date of Patent: May 17, 2011

(54) METHOD FOR DYNAMICALLY IDENTIFYING LOCATIONS OF MOBILE NODES IN A TIME DIVISION MULTIPLE ACCESS BASED AD HOC COMMUNICATION NETWORK

(75) Inventors: Avinash Joshi, Lake Mary, FL (US); Michael S. Johnson, Orlando, FL (US); Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1022 days.

(21) Appl. No.: 11/754,746

(22) Filed: May 29, 2007

(65) Prior Publication Data

US 2008/0298280 A1 Dec. 4, 2008

(51) Int. Cl.
*H04B 7/212* (2006.01)
(52) U.S. Cl. ........ 370/347; 370/328; 370/329; 370/337; 370/341; 370/346; 455/456.1; 455/456.6; 455/457; 455/456.5
(58) Field of Classification Search .................. 370/445, 370/447; 455/456.1–456.6, 421, 435.1, 450–453
See application file for complete search history.

(56) References Cited

U.S. PATENT DOCUMENTS

| | | | |
|---|---|---|---|
| 2003/0125138 A1 | 7/2003 | John et al. | |
| 2005/0143199 A1 | 6/2005 | Saroyan | |
| 2005/0169238 A1 * | 8/2005 | Yang et al. | 370/351 |
| 2005/0270156 A1 | 12/2005 | Ravet | |
| 2006/0198346 A1 * | 9/2006 | Liu et al. | 370/338 |
| 2007/0071026 A1 * | 3/2007 | Rogers | 370/458 |

OTHER PUBLICATIONS

PCT/US2008/064076, International Search Report and Written Opinion, mailed Sep. 15, 2008, 12 pages.
Wie, Sung Hong et al., "Time Slot Allocation Scheme Based on a Region Division in CDMA/TDD Systems," VTC 2001 Spring, IEEE 2001, pp. 2445-2449.
Lee, Jiwoong. et al., "An Adaptive Time Slot Allocation Strategy for W-CDMA/TDD System," VTC 2001 Spring, IEEE 2001, pp. 2509-2513.
PCT/US2008/064076, Preliminary Report on Patentability, mailed Dec. 10, 2009, 8 pages.

* cited by examiner

*Primary Examiner* — Ajit Patel
*Assistant Examiner* — Dung Lam
(74) *Attorney, Agent, or Firm* — Randi L. Karpinia

(57) ABSTRACT

Disclosed is a method for dynamically identifying locations of a plurality of mobile nodes in a time division multiple access (TDMA) based ad hoc communication network, wherein one or more mobile nodes are being moved in and out of a predefined region. The method comprises allocating a hello slot in a dedicated channel of the TDMA based ad hoc communication network to each of the mobile nodes and announcing the allocation to the mobile nodes through hello slot allocation map, receiving location information from each of the mobile nodes during their hello slot and determining mobile nodes that are inside the predefined region based on the received location information, allocating a data slot to each determined mobile nodes inside the predefined region and announcing the allocation to the mobile nodes through data slot allocation map, and receiving updated location information from each determined mobile nodes during their data slot.

18 Claims, 7 Drawing Sheets

METHOD FOR DYNAMICALLY IDENTIFYING LOCATIONS OF MOBILE NODES IN A TIME DIVISION MULTIPLE ACCESS BASED AD HOC COMMUNICATION NETWORK

FIELD OF THE INVENTION

The present invention relates generally to ad hoc communication networks, and in particular to dynamically identify locations of mobile nodes in a Time Division Multiple Access (TDMA) based ad hoc communication network.

BACKGROUND

With the advent of information technology, real time locating of objects is growing in prevalence. For example, location determination technology is being used to locate inventory, livestock, vehicle fleets, and individuals in an ad hoc work area, such as an emergency scene and the like. Location determination technology is also being used to streamline supply chains for corporations, seeking to move products to the market faster, and to monitor assets and prevent inventory loss. Also, location determination technology is beginning to be utilized in the sports and gaming industry.

Some sophisticated professional sports around the world such as football and soccer teams make use of location determination technology to determine the location of players in a playing field for the purpose of displaying and/or recording the movements of the players within the field. Such information can be reviewed and/or used, for example, thereafter to analyze player performance of players and formulate strategies for future games.

Location determination systems and methods have been proposed in the past to determine the location of objects. One such system tracks a football using two transmitters inside the football. Such a system is limited to tracking the football and uses a referee transmitter signal at a different frequency to start the location tracking/recording. Another technique determines the location of the object through a combined use of direction of arrival of signals at each of several widely spaced reception points, using closely spaced antennas at each point, with relative phase between the received signals at the widely spaced points.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
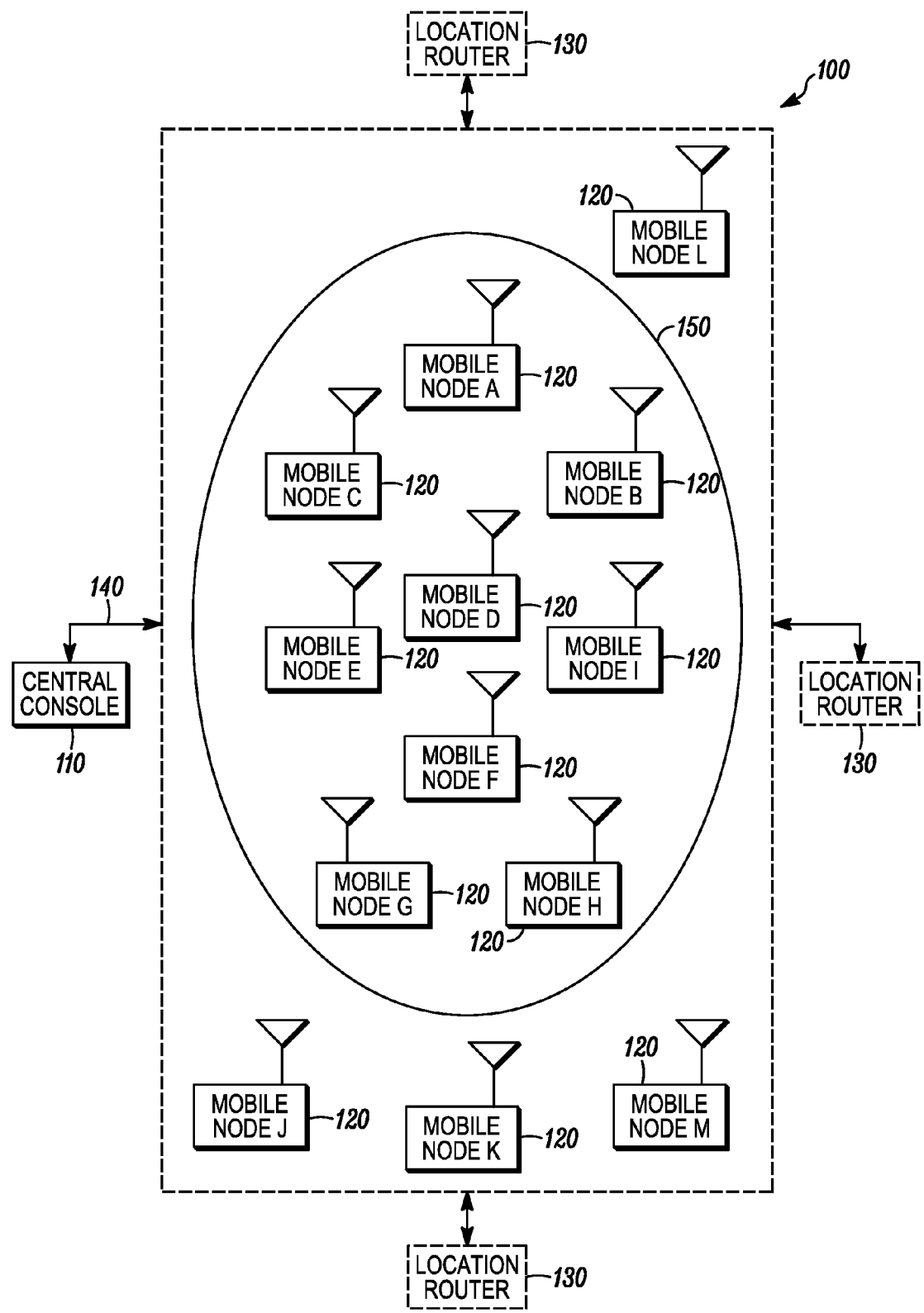
FIG. 1A is a block diagram of a TDMA based ad hoc communication network in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to dynamically identifying locations of mobile nodes in time division multiple access (TDMA) based ad hoc communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for dynamically identifying locations of mobile nodes in a TDMA based ad hoc communication network described herein. The non-processor circuits may include, but are not limited to, a radio receiver, a radio transmitter, signal drivers, clock circuits, power source circuits, and user input devices. As such, these functions may be interpreted as steps of a method for dynamically identifying locations of mobile nodes in a TDMA based ad hoc communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The present invention provides for dynamically identifying the locations of the mobile nodes in a time division multiple access based ad hoc communication network. In particular, when the mobile nodes are frequently moving inside and outside of a predefined region of the network, the present invention dynamically identifies the location of the mobile nodes without human intervention.

Figure 1B:
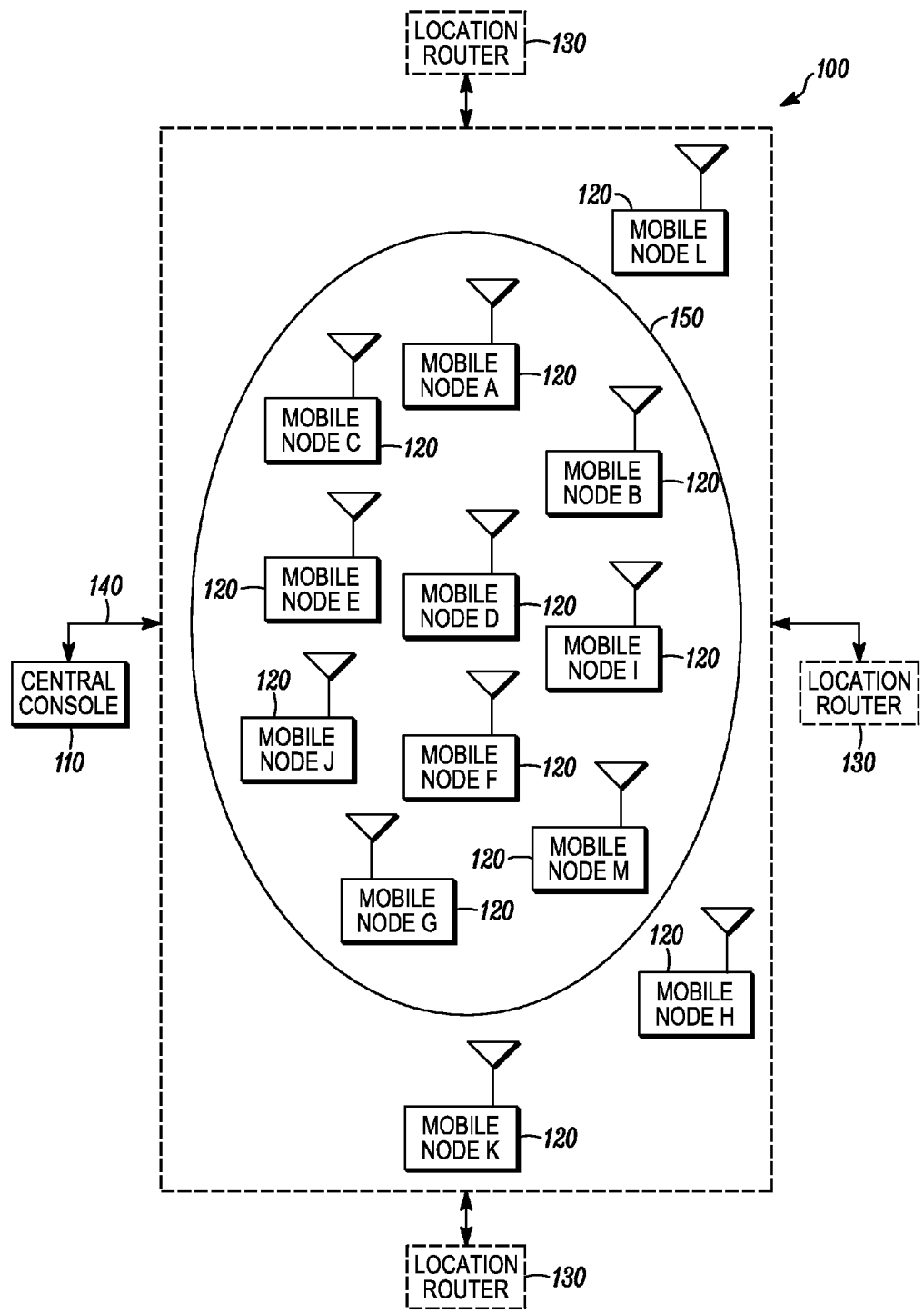
FIG. 1B is a block diagram of the TDMA based ad hoc communication network of FIG. 1A as some of the mobile nodes have moved in and out of a predefined region in the network, in accordance with some embodiments of the present invention.

Referring to FIGS. 1A-1B, a time division multiple access based ad hoc communication network for use in the implementation of at least some embodiments of the present invention, is shown. Specifically, the time division multiple access (TDMA) based network 100 (hereinafter referred to as network 100) comprises a central console 110, and a plurality of mobile nodes 120 (identified as mobile nodes A through M). The central console 110, such as a base station, is employed by the network 100 to control the scheduling of timeslots in a dedicated channel of the network 100 to enable the mobile nodes 120A-M to communicate with the central console 110.

Each of the mobile nodes 120A-M is designed to determine its own current position. For example, a mobile node 120 can include a global positioning system (GPS) module for calculating its location using a standard global positioning system (GPS). In another embodiment, the network 100 includes at least three location routers 130 for sending measurement signals at periodic time intervals to the mobile nodes 120A-M. The measurement signals include the location coordinates of the location routers 130. The location coordinates can be an absolute geo-location coordinates or a relative location coordinates of the location routers 130. The measurement signal can further include signaling information to synchronize the mobile nodes 120A-M with each other. The mobile nodes 120A-M receiving the measurement signals compute their location information using triangulation method.

Each of the mobile nodes 120A-M communicate its location information to the central console 110 during its allotted time slots. The mobile node 120A-M can switch to powersaving mode when not communicating with the central console. The power-saving mode enables the mobile node 120A-M to conserve power thereby extending the battery life of the mobile nodes 120A-M.

Each of the mobile nodes 120A-M can move geographically while it is communicating over a wireless link 140 to the central console 110. The central console 110 defines a predefined region 150 in the network 100. The predefined region 150 can be any geographical space within the network 100. The mobile nodes 120A-M are designed to move inside and outside of the predefined region 150 while communicating (e.g. location information) over the wireless link 140 to the central console 110. For example, referring to FIG. 1B, it can be seen that after a time period, the mobile nodes 120J and 120M have moved inside the predefined region 150 while the mobile node 120H has moved outside the predefined region 150.

Figure 2:
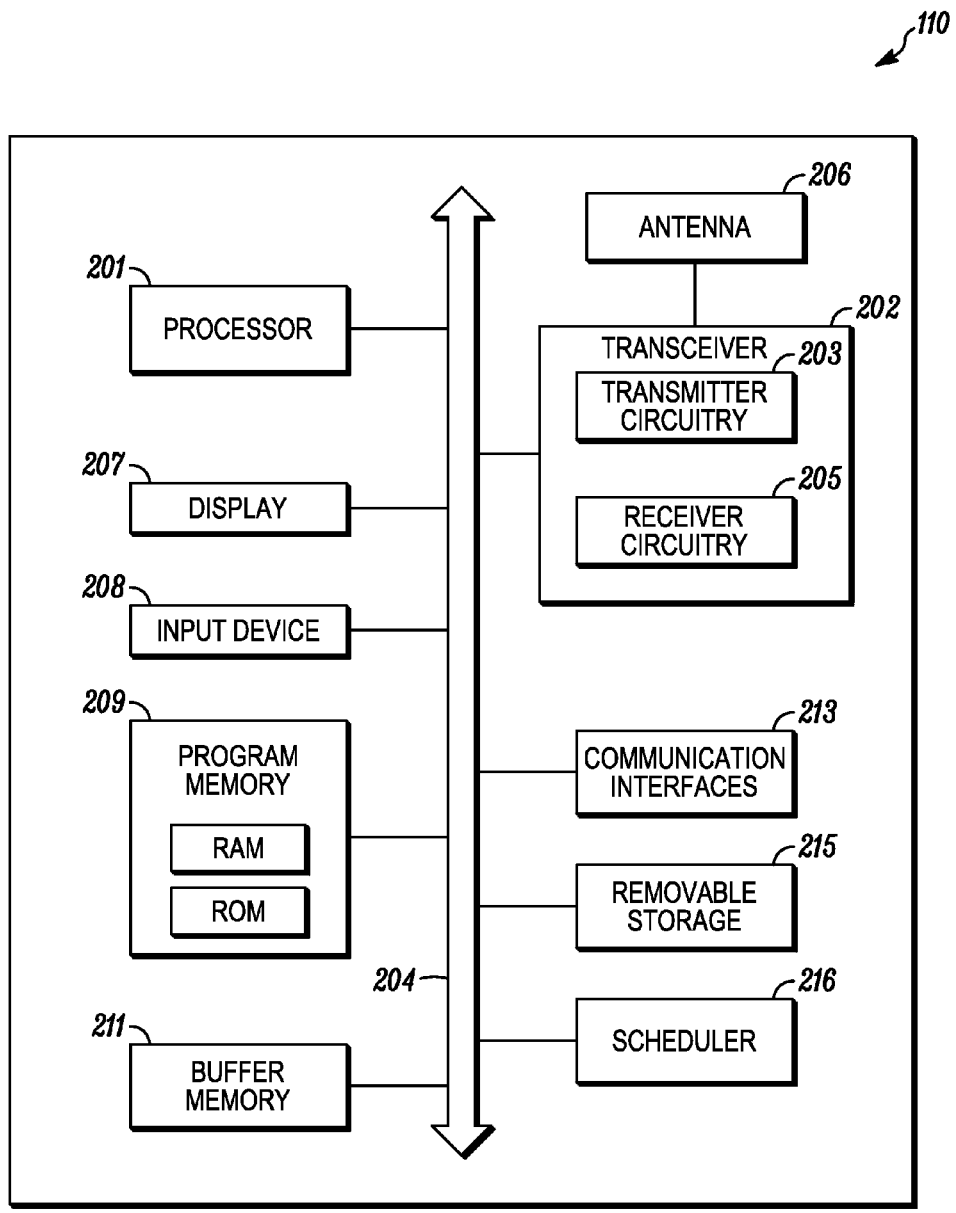
FIG. 2 is a block diagram of a central console in accordance with some embodiments of the present invention.

Referring to FIG. 2, a block diagram of a central console 110 is shown. The central console 110 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the central console 110 also can include an antenna switch, duplexer, circulator, or other highly isolative means for intermittently providing information packets from the transmitter circuitry 203 to the antenna 206 and from the antenna 206 to the receiver circuitry 205. The central console 110, for example, can be an integrated unit containing at least all the elements depicted in FIG. 2, as well as any other elements necessary for the central console 110 to perform its particular functions. Alternatively, the central console 110 comprises a collection of appropriately interconnected units or devices, wherein such units or devices perform functions that are equivalent to the functions performed by the elements of the central console. For example, the central console 110 comprises a laptop computer and a wireless LAN (Local Area Network) card.

The processor 201 includes one or more microprocessors, microcontrollers, DSPs (Digital Signal Processors), state machines, logic circuitry, or any other device or devices that process information based on operational or programming instructions. Such operational or programming instructions are stored in the program memory 209. The program memory 209 can be an IC (Integrated Circuit) memory chip containing any form of RAM (Random Access Memory) or ROM (Read-Only Memory), a floppy disk, a CD-ROM (Compact Disk Read-Only Memory), a hard disk drive, a DVD (Digital Video Disc), a flash memory card or any other medium for storing digital information. One of ordinary skill in the art will recognize that when the processor 201 has one or more of its functions performed by a state machine or logic circuitry, the memory 209 containing the corresponding operational instructions can be embedded within the state machine or logic circuitry. The operations performed by the processor 201 and the rest of the central console 110 are described in detail below.

The transmitter circuitry 203 and the receiver circuitry 205 enable the central console 110 to communicate information packets to and acquire information packets from the mobile nodes 120A-M. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over time division multiple access (TDMA) and an ad hoc networking air interface (e.g., BLUETOOTH, 802.11 WLAN (wireless local area network), 802.16 WiMax (Worldwide Interoperability for Microwave Access), and the like)

The implementations of the transmitter circuitry 203 and the receiver circuitry 205 depend on the implementation of the central console 110. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the central console 110 or insertable into the central console 110 (e.g., embodied in a wireless radio frequency (RF) modem implemented on a Personal Computer Memory Card International Association (PCMCIA) card). For a wireless communication device, the transmitter circuitry 203 and the receiver circuitry 205 are implemented as part of the wireless device hardware and software architecture in accordance with known techniques. Most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of radio frequency (RF) signals from within at least one bandwidth and optionally more bandwidths, if the communications with the proximate device are in a frequency band other than that of the network communications. The receiver circuitry 205 optionally comprises a first receiver and a second receiver, or one receiver designed to allow receiving within two or more bandwidths. The transceiver 202 includes at least one set of transmitter circuitry 203. The at least one transmitter 203 can be designed to allow transmitting to multiple devices on multiple frequency bands. As with the receiver 205, dual transmitters 203 can optionally be employed where one transmitter, for example, is for the transmission to a proximate node or direct link establishment to one or more WLANs and the other transmitter is for transmission to one or more cellular communication system.

The antenna 206 comprises any known or developed structure for radiating and receiving electromagnetic energy in the frequency range containing the wireless carrier frequencies.

The buffer memory 211 can be any form of volatile memory, such as RAM, and is used for temporarily storing received information packets in accordance with the present invention.

In one embodiment, the central console 110 is constructed to receive location information from each of the mobile nodes 120A-M. The central console 110 includes a scheduler 216 to schedule the timeslots for each of the mobile nodes 120A-M to provide a communication mechanism between each of the mobile nodes 120A-M in the network 100 and the central console 110. It will be appreciated that the scheduler 216 can be implemented as part of the processor 201 as illustrated or alternatively as a separate module within the central console 110.

In an alternate embodiment, the central console 110 can further include programming instructions for execution by the processor 201 to generate, based on the received location information of each of the mobile nodes 120A-M in the network, a visual display illustrating the location of the mobile nodes 120A-M and a visual indication indicating the presence of the mobile nodes 120A-M inside the predefined region 150 as well as the presence of mobile nodes 120A-M outside the predefined region 150.

Figure 3:
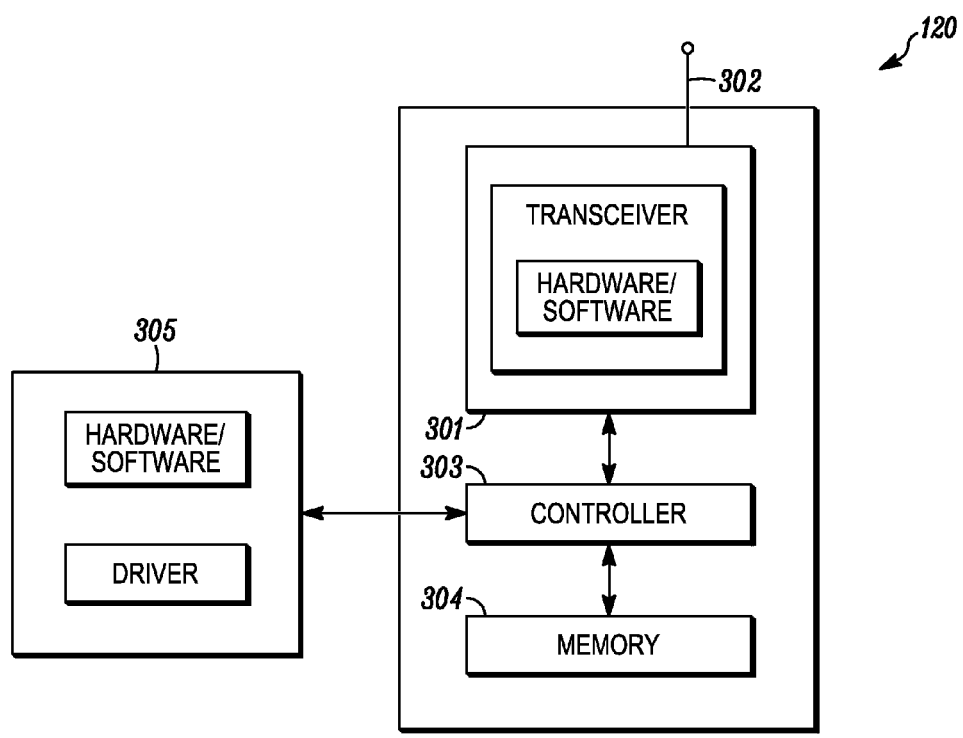
FIG. 3 is a block diagram of a mobile node in accordance with some embodiments of the present invention.

FIG. 3 is a block diagram of a mobile node 120. The mobile node 120 includes at least one transceiver or modem 301, which is coupled to an antenna 302 for receiving and transmitting signals, such as packetized signals, to and from the mobile node 120, under the control of a controller 303. The packetized data signals can include, for example, voice, data or multimedia information, and packetized control signals, including node update information.

The mobile node 120 further includes a memory 304, such as a random access memory (RAM) for storing, among other things, routing information pertaining to itself and other nodes 120 in the network 100. In one embodiment, the mobile node 120 includes a host 305 which may consist of any number of devices, such as a notebook computer terminal, mobile telephone unit, mobile data unit, or any other suitable device. The mobile node 120 also can include the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) can also be included. Each of the mobile nodes 120A-M in the network 100 is synchronized to a common clock. Synchronizing the clocks which control the transmission time and the unique assignment of timeslots can prevent the transmission of signals from more than one node at any particular time. In one embodiment, the mobile nodes 120A-M can be synchronized to this clock via distributed synchronization technique.

Figure 4:
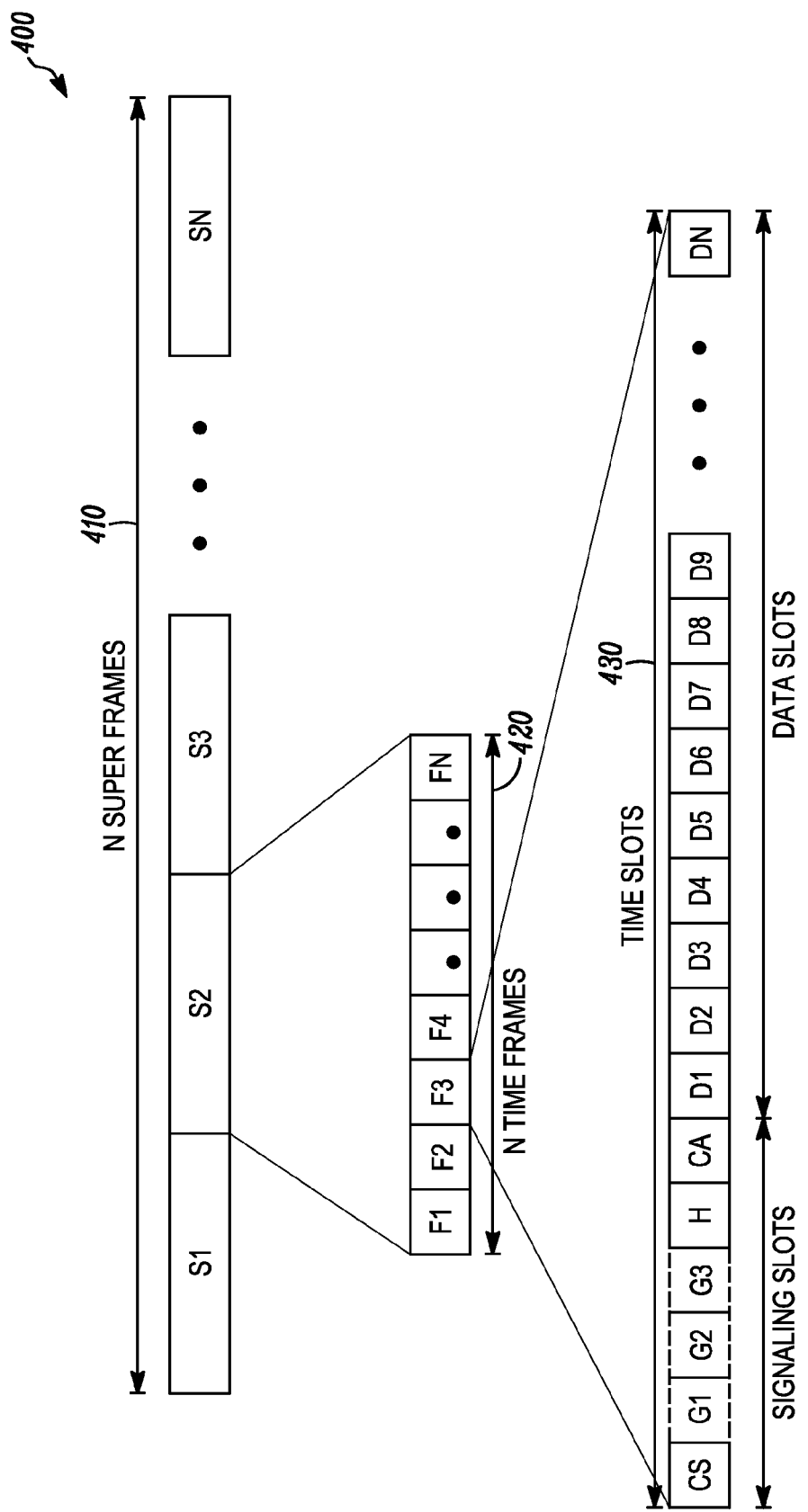
FIG. 4 illustrates a multi-level framing structure of a dedicated channel according to one implementation of the present invention.

FIG. 4 shows a multi-level framing structure 400 of a dedicated channel according to one implementation. In this example, the multi-level framing structure 400 of the dedicated channel comprises a plurality of super frames (S1-SN) 410. Each super frame 410 comprises a plurality of timeframes (F1-FN) 420. Each timeframe 420 comprises a plurality of timeslots 430. Each of the mobile nodes 120A-120M in the network 100 has been assigned one or more of the timeslots 430 in the timeframe 420. In one possible implementation of this multi-level framing structure 400, each super frame 410 can be one (1) second (s) in length and can be divided into hundred (100) timeframes 420 each of which are ten (10) milliseconds (ms) in duration. Each of the hundred (100) timeframes 420 can be further sub-divided into fifty (50) timeslots 430.

The timeslots 430 in a single timeframe 420 are divided into two categories namely signaling slots and data slots. The signaling slots comprise a central console slot (CS), a hello slot (H), and a contention access slot (CA). The central console slot (CS) is used by the central console 110 to announce the allocation of timeslots 430 to the mobile nodes 120A-M in the network 100. One hello slot (H) is assigned to each of the mobile nodes 120A-M per super frame 410 which amounts to one hello slot per second (100 hello slots in a super frame 410). The contention access slot (CA) is used for contention free access to facilitate new mobile nodes entering the network 100 to request a hello slot (hello slot request) from the central console 110.

In some embodiments, when the location routers 130 are used to compute the location information of mobile nodes 120A-M, then each location router 130 is assigned one timeslot 430 in the timeframe 420. In this example, each of the three location router 130 is assigned one time slot (G1-G3) in the timeframe 420. Further, the central console 110 allocates the data slots (D1-DN) to mobile nodes 120A-M that are currently inside the predefined region 150 of the network 100. In this example, there are total of 44 data slots (out of 50 slots per timeframe 420). The data slots are used by the mobile nodes 120A-M (for example, mobile nodes 120A-1 in FIG. 1A) that are inside the predefined region to communicate its updated location information to the central console 110. Such updated location information is sent every ten (10) milliseconds (ms).

Figure 5:
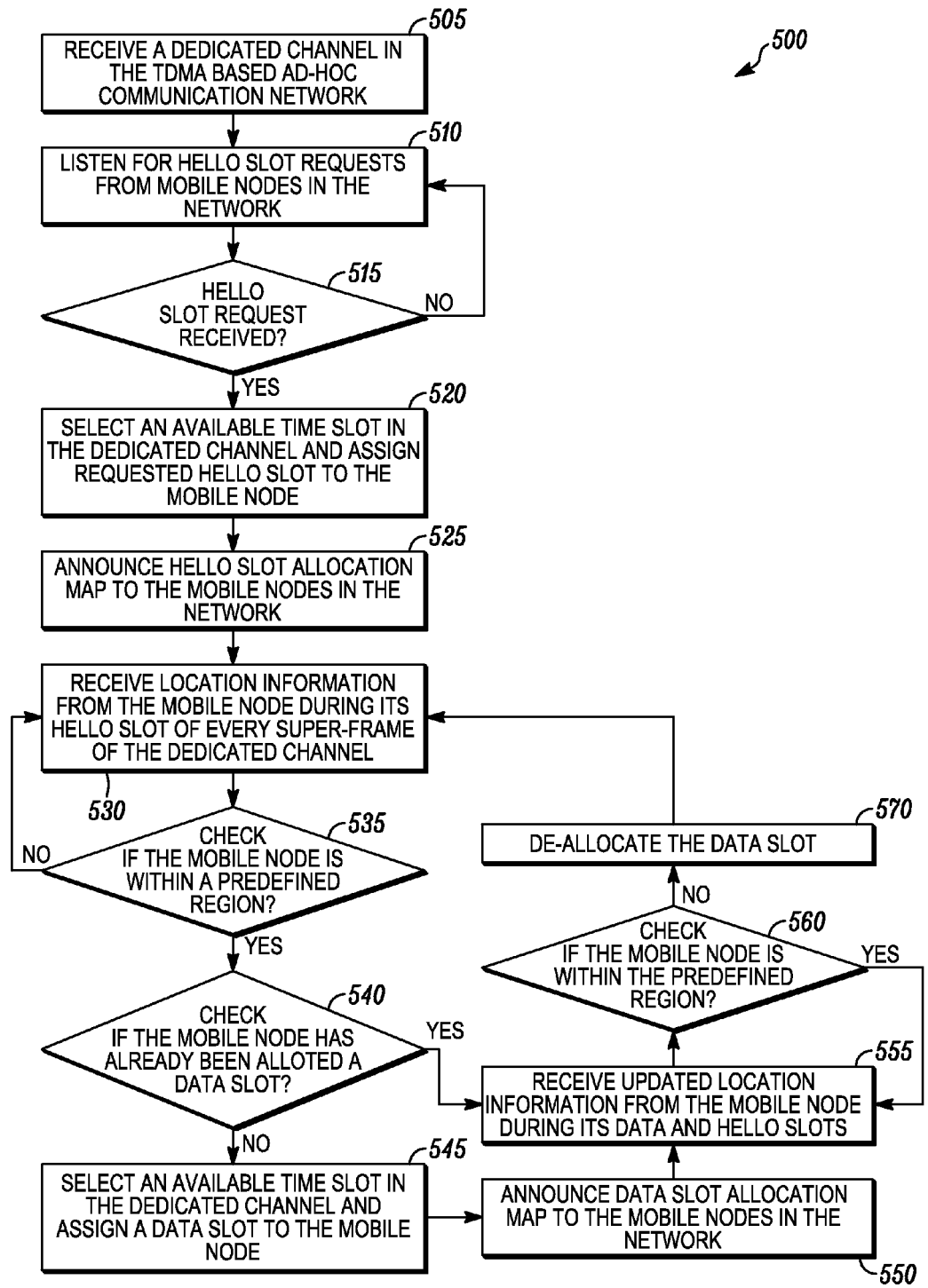
FIG. 5 is a flowchart showing a method for dynamically identifying locations of a plurality of mobile nodes in a TDMA based ad hoc communication network from the perspective of a central console, according to an embodiment of the present invention.

FIG. 5 is a flowchart showing a method 500 for dynamically identifying locations of mobile nodes 120A-M in the TDMA based ad hoc communication network 100 from the perspective of the central console 110, in accordance with some embodiments of the invention. Initially, at step 505, the central console 110 receives a dedicated channel in the TDMA based ad hoc communication network 100. Next, at step 510, after receiving the dedicated channel, the central console 110 listens for hello slot requests from new mobile nodes that enter the network 100.

Next at step 515, the central console checks if it has received a hello slot request from one or more mobile nodes 120A-M entering the network 100. As stated earlier, the mobile nodes 120A-M use the contention access slot of the timeframe 420 to send hello slot requests to the central console 110. When the central console 110 has not received a hello slot request from one or more of the mobile nodes 120A-M entering the network, the process periodically cycles back and checks for receipt. Whenever the central console receives a hello slot request from a mobile node 120A-M entering the network, then at step 520, the central console 110 randomly selects one of the available hello timeslot 430 in the super frame 410 of the dedicated channel and allocates this hello slot to the requesting node.

Next, at step 525, the central console 110 uses the central console slot to announce the allocation of hello slots to mobile nodes 120A-M. In one embodiment, the central console 110 announces the allocation of hello slots to mobile nodes 120A-M by broadcasting a hello slot allocation map to the mobile nodes 120A-M in the network 100. The central console 110 can send the hello slot allocation map in its periodic broadcasts of hello messages during its central console slot. The hello slot allocation map can include name/identification (ID) of mobile nodes 120A-M which have been allocated hello slots.

Next, at step 530, the central console receives location information during a hello slot of a particular mobile node 120. Next, at step 535, the central console determines whether the mobile node 120 is inside a predefined region 150 of the network 100 based on the received location information. When the mobile node 120 is outside the predefined region 150, the central console 110 continues to receive location information from this mobile node 120 in their assigned hello slot. At step 540, when the mobile node 120 is inside the predefined region 150 of the network 100, the central console 110 checks whether the mobile node has already been allotted a data slot. When the mobile node 120 has not been allotted a data slot, then at step 545, the central console 110 selects an available data timeslot 430 and allocates this data slot to the determined mobile node 120.

Next, at step 550, the central console 110 periodically announces during its central console slot, the allocation of data slots to the mobile nodes 120A-M in the network 100. In one embodiment, the central console announces the allocation of data slots to mobile nodes 120A-M by broadcasting a data slot allocation map to the mobile nodes 120A-M in the network 100. The data slot allocation map can include name/ID of mobile nodes 120A-M which have been allocated data slots.

Next, at step 555, when the mobile node 120 has already been allotted a data slot, the central console 110 receives updated location information from the mobile node 120 during its assigned data slot as well as hello slot. After receiving the updated location information from the mobile node 120, at step 560, the central console 110 once again determines whether the mobile node 120 is inside the predefined region 150 based on the received updated location information. When the mobile node 120 is inside the predefined region 150 of the network 100, the central console 110 continues to receive location information from the mobile node 120 during its data and hello slot of dedicated channel as shown in step 555. If the central console 110 determines that the mobile node 120 has moved outside the predefined region 150, the central console 110 deallocates the data slot from the mobile node 120, as shown in step 570, and continues to receive updated location information only on mobile node's periodic hello slot as shown in step 530. When the mobile node 120 finds its name/ID disappearing from the data slot allocation map, the mobile node stops sending location information in that data slot and only send the location information in its own hello slot. When the data slots are deallocated from the mobile nodes 120A-M, the central console 110 marks the deallocated data slots as available for future allocations.

Figure 6:
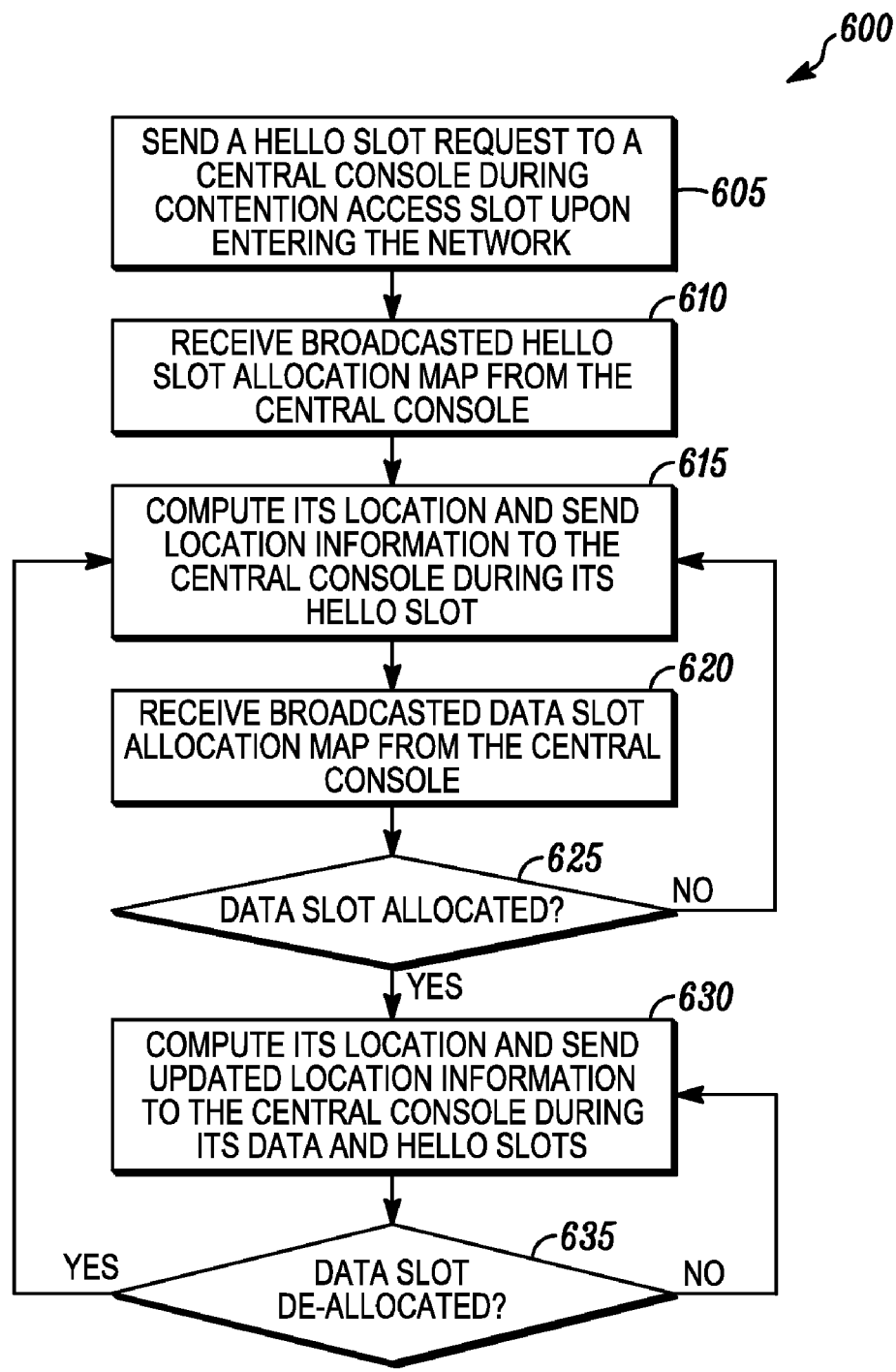
FIG. 6 is a flowchart showing a method for dynamically identifying locations of a plurality of mobile nodes in a TDMA based ad hoc communication network from the perspective of a mobile node, according to an embodiment of the present invention.

FIG. 6 is a flowchart showing a method 600 for dynamically identifying locations of mobile nodes 120A-M in the TDMA based ad hoc communication network 100 from the perspective of the mobile nodes 120A-M, in accordance with some embodiments of the invention. As a new mobile node 120 enters the network 100, at step 605, it sends a hello slot request to the central console 110 using a contention access slot of the dedicated channel. Next at step 610, the mobile node receives a broadcasted hello slot allocation map from the central console 110 which indicates whether the hello slot has been allocated to the mobile node 120. After receiving the broadcasted hello slot allocation map from the central console 110, the mobile node 120 checks the presence of its own identity in the broadcasted hello slot allocation map. The mobile node 120 continues to send hello slot request until a hello slot is assigned to it.

Next, at step 615, when the identity of the mobile node 120 is present in the received hello slot allocation map, the mobile node 120 computes its location information and communicates its location information to the central console 110 in its assigned hello slot. As stated earlier, the mobile node 120 computes its location either using the standard GPS technology or by receiving measurement signals from the location routers 130 or another equivalent method.

At step 620, the mobile node 120 receives the broadcasted data slot allocation map from the central console 110 which indicates whether the data slot has been allocated to the mobile node 120. Next, at step 625, the mobile node checks whether it has been allotted data slot by checking the presence of its own identity in the received data slot allocation map. When the mobile node 120 has been allotted data slot, then at step 630, the mobile node again once again computes its location information and communicates its updated location information to the central console 110 in its assigned data as well as hello slot.

Next, at step 635, after receiving the periodic data slot allocation map, the mobile node 120 checks the presence of its own identity in the received data slot allocation map to determine whether the data slot has been deallocated by the central console 110. As described previously herein, the central console 110 deallocates the data slot of a mobile node 120 when it determines based on the received location information that the mobile node 120 has moved outside the predefined region 150 of the network 100. If the data slot of the mobile node 120 has been deallocated, then the mobile node 120 communicates its location information only in its assigned hello slot as shown in step 615. When the data slot has not been deallocated by the central console 110 i.e. when the mobile node is still inside the predefined region 150 of the network 100, the mobile node 120 continues to communicate its location information to the central console 110 in its assigned data and hello slots as shown in step 630.

The network 100 can be operatively utilized, for example, to dynamically locate players during a game (e.g. football, hockey, and the like). In games like football and hockey, since the players are being frequently swapped in and out of the playing field, it is very important to dynamically locate the players who constantly move in and out of the playing field.

The network 100 locates the players dynamically without human intervention when the players are being swapped inside and outside of the playing field. Locating and tracking the movement of players during the game helps in analyzing the performance of players and formulating strategies for future games. In such a scenario, the mobile nodes 120A-M can be associated with players, for example, the mobile nodes 120A-M can be placed in each player's gear, such that each of the mobile nodes 120A-M can be associated with a single player during the game. The predefined region 150 can represent the playing field (e.g. football field, hockey field, and the like) during the game. As stated earlier, the central console 110 controls the scheduling of timeslots in the dedicated channel which the mobile nodes 120A-M uses to communicate the location information of each of the players during the game.

In operation, when the game starts, all the mobile nodes 120A-M associated with the players inside the stadium send a hello slot request to the central console 110 using the contention access slot. The central console 110 periodically announces the allocation of hello slots to the players using the hello slot allocation map.

Referring again to FIGS. 1A-1B, the mobile nodes 120A-M associated with the players receive hello slot from the central console 110. During the game, the mobile nodes 120A-M periodically sends the location information of players to the central console in their hello slots. When the central console 110 receives the location information from players, the central console 110 checks whether the player is inside the playing field (predefined region 150). When the player is inside the playing field, the central console 110 allocates a data slot to all the players (mobile nodes 120A-1 in FIG. 1A) who are inside the playing field. However the players (mobile nodes 120J-M in FIG. 1A) who are outside the playing field does not receive the data slot.

The players (mobile nodes 120A-1 in FIG. 1A) communicate their updated location information to the central console in their assigned data slot in addition to periodic location information update in their hello slot. As soon as the central console 110 finds an in-field player moving out of the field (mobile node 120H in FIG. 1B), the central console 110 takes back the assigned data slot. This data slot can later be given to a new player who is reporting location inside of field. At this point, according to the multi-level framing structure as discussed in FIG. 4, players who are inside the field can be tracked at greater accuracy (location update happens every 10 milliseconds interval as allocated data slot repeats once per frame) as compared to the players outside the field (location update happens every one second interval as assigned hello slot repeats once per super frame).

The network 100 can be operatively utilized, in another example, to dynamically identify locations, for example rescue and fire service personnel operating at an emergency response site. The network 100 can further be operatively utilized for tracking vehicles operating in an area, and tracking visitors and personnel operating in a secured building. It will be appreciated by those of ordinary skills in the art that the examples of utilizing the network of the present invention are solely for illustrative purposes only, and that there are many other useful examples of utilizing the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for dynamically identifying locations of a plurality of mobile nodes in a time division multiple access (TDMA) based ad hoc communication network, wherein one or more of the mobile nodes are being moved in and out of a predefined geographic region, comprising:
   at a central console:
   allocating a hello slot from a plurality of time slots in a dedicated channel of the TDMA based ad hoc communication network to each of the mobile nodes and announcing the allocation to the mobile nodes through hello slot allocation map;
   receiving location information from each of the mobile nodes during their hello slot and determining mobile nodes that are inside the predefined geographic region based on comparing the received location information to the predefined geographic region;
   allocating a data slot from the plurality of time slots to each determined mobile nodes inside the predefined geographic region and announcing the allocation to the mobile nodes through data slot allocation map; and
   receiving updated location information from each determined mobile nodes during their data slot and hello slot.

2. The method of claim 1, further comprising determining mobile nodes that are outside the predefined geographic region based on comparing the received updated location information to the predefined geographic region and deallocating the data slots from each determined mobile nodes outside the predefined geographic region.

3. The method of claim 2, further comprising marking the deallocated data slots as available for future allocations.

4. The method of claim 1, further comprising listening for the hello slot request from the mobile nodes before allocating the hello slot to the mobile nodes.

5. The method of claim 1, wherein the allocating the hello slot comprises assigning the hello slot to mobile nodes in response to receiving a hello slot request from the mobile nodes during a contention access slot of the dedicated channel.

6. The method of claim 1, wherein the announcing the allocation to the mobile nodes through hello slot allocation map comprises broadcasting the hello slot allocation map to the mobile nodes during a central console slot of the dedicated channel.

7. The method of claim 1, wherein the announcing the allocation to the mobile nodes through data slot allocation map comprises broadcasting the data slot allocation map to the mobile nodes during a central console slot of the dedicated channel.

8. The method of claim 1, wherein the location information is determined by each of the mobile nodes using a standard global positioning system.

9. The method of claim 1, wherein the location information is determined by each of the mobile nodes by receiving measurement signals at periodic intervals from at least three location routers.

10. A device for dynamically identifying locations of a plurality of mobile nodes in a time division multiple access (TDMA) based ad hoc communication network, wherein one or more of the mobile nodes are being moved in and out of a predefined geographic region, the device comprising:

a transceiver configured to wirelessly communicate with the mobile nodes, and a processor communicatively coupled to the transceiver, the processor configured to:

allocate a hello slot from the plurality of time slots in the dedicated channel to each of the mobile nodes and announces the allocation to mobile nodes through hello slot allocation map;

enable the transceiver to receive location information from each of the mobile nodes during their hello slot and determines mobile nodes that are inside the predefined geographic region based on comparing the received location information to the predefined geographic region;

allocates a data slot from the plurality of time slots to each determined mobile nodes inside the predefined geographic region and announces the allocation to mobile nodes through data slot allocation map; and enable the transceiver to receive updated location information from each determined mobile nodes during their data slot and hello slot.

11. The device of claim 10, wherein the processor is further configured to determine mobile nodes that are outside the predefined geographic region based on comparing the received updated location information to the predefined geographic region and deallocate the data slots from each determined mobile nodes outside the predefined geographic region.

12. The device of claim 11, wherein the processor is further configured to mark the deallocated data slots as available for future allocations.

13. The device of claim 10, wherein the processor is further configured to enable the transceiver to listen for the hello slot request from the mobile nodes before allocating the hello slot to the mobile nodes.

14. The device of claim 13, wherein the transceiver receives the hello slot request from the mobile nodes during a contention access slot of the dedicated channel.

15. The device of claim 10, wherein the processor is further configured to enable the transceiver to send the hello slot allocation map in its periodic broadcast of hello messages.

16. The device of claim 15, wherein the processor is further configured to enable the transceiver to broadcast the hello messages during a central console slot of the dedicated channel.

17. The device of claim 10, wherein the console processor is further configured to enable the transceiver to send the data slot allocation map in its periodic broadcast of hello messages.

18. The device of claim 10, wherein the processor is further configured to enable the transceiver to broadcast hello messages during a central console slot of the dedicated channel.

* * * * *

UNITED STATES PATENT AND TRADEMARK OFFICE
CERTIFICATE OF CORRECTION

| | | |
|---|---|---|
| PATENT NO. | : 7,944,905 B2 | Page 1 of 1 |
| APPLICATION NO. | : 11/754746 | |
| DATED | : May 17, 2011 | |
| INVENTOR(S) | : Joshi et al. | |

It is certified that error appears in the above-identified patent and that said Letters Patent is hereby corrected as shown below:

In Column 6, Line 57, delete "120A-1" and insert -- 120A-I --, therefor.

In Column 9, Line 32, delete "120A-1" and insert -- 120A-I --, therefor.

In Column 9, Line 36, delete "120A-1" and insert -- 120A-I --, therefor.

In Column 11, Line 10, in Claim 10, delete "announces" and insert -- announce --, therefor.

In Column 11, Line 15, in Claim 10, delete "determines" and insert -- determine --, therefor.

In Column 11, Line 19, in Claim 10, delete "allocates" and insert -- allocate --, therefor.

In Column 11, Line 21, in Claim 10, delete "announces" and insert -- announce --, therefor.

In Column 12, Line 21, in Claim 17, after "the" delete "console".

Signed and Sealed this
First Day of January, 2013

David J. Kappos
*Director of the United States Patent and Trademark Office*